(12) United States Patent
Noguchi et al.

(10) Patent No.: US 11,977,363 B2
(45) Date of Patent: May 7, 2024

(54) MACHINE TOOL AND CONTROL DEVICE

(71) Applicant: CITIZEN WATCH CO., LTD., Nishitokyo (JP)

(72) Inventors: Kenji Noguchi, Sayama (JP); Hitoshi Saito, Tokorozawa (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 540 days.

(21) Appl. No.: 17/284,473

(22) PCT Filed: Oct. 24, 2019

(86) PCT No.: PCT/JP2019/041778
§ 371 (c)(1),
(2) Date: Apr. 12, 2021

(87) PCT Pub. No.: WO2020/085451
PCT Pub. Date: Apr. 30, 2020

(65) Prior Publication Data
US 2021/0389747 A1     Dec. 16, 2021

(30) Foreign Application Priority Data

Oct. 26, 2018 (JP) ................................ 2018-202337

(51) Int. Cl.
*B23B 29/04* (2006.01)
*B23B 1/00* (2006.01)
(Continued)

(52) U.S. Cl.
CPC ............ *G05B 19/4083* (2013.01); *B23B 1/00* (2013.01); *B23B 29/04* (2013.01);
(Continued)

(58) Field of Classification Search
CPC .......... B23B 1/00; B23B 29/04; B23B 25/02; G05B 2219/36043; G05B 2219/36086;
(Continued)

(56) References Cited

U.S. PATENT DOCUMENTS 5,778,745 A * 7/1998 Furusawa ............... B23B 25/02
451/28
5,911,802 A * 6/1999 Kimura ................... B23B 25/02
82/904
(Continued)

FOREIGN PATENT DOCUMENTS

CN       106794521 A       5/2017
JP       2013059841 A      4/2013
(Continued)

OTHER PUBLICATIONS

Dec. 17, 2019, International Search Report issued in the International Patent Application No. PCT/JP2019/041778.
(Continued)

*Primary Examiner* — Sara Addisu
(74) *Attorney, Agent, or Firm* — KENJA IP LAW PC

(57) ABSTRACT

A machine tool and a control device therefor, wherein vibration cutting of a workpiece is carried out by means of a tool and wherein, after the vibration cutting, finish-cutting is carried out for cutting a finishing allowance of the workpiece by means of the tool, without relative vibration between the workpiece and the tool, by relatively rotating the workpiece and the tool and relatively moving them in the feed direction. According to the invention, before the vibration cutting, a finishing allowance calculation means calculates a finishing allowance remaining on the workpiece after vibration cutting has been completed, and a determination means determines whether or not the finishing allowance as (Continued)

calculated by the finishing allowance calculation means is less than, or equal to a predetermined threshold value.

14 Claims, 5 Drawing Sheets

(51) Int. Cl.
  *G05B 19/4069* (2006.01)
  *G05B 19/408* (2006.01)
(52) U.S. Cl.
  CPC .............. *G05B 19/4069* (2013.01); *G05B 2219/36043* (2013.01); *G05B 2219/36071* (2013.01)
(58) Field of Classification Search
  CPC .......... G05B 2219/36178; G05B 2219/45215; G05B 19/4093; G05B 19/4083; G05B 19/4069; G05B 2219/36071; G05B 2219/50211; G05B 9/182; G05B 2219/49392; B23Q 15/013; B23G 1/02
  See application file for complete search history.

(56) References Cited

U.S. PATENT DOCUMENTS

| | | | | |
|---|---|---|---|---|
| 6,925,915 | B1* | 8/2005 | Claesson | G05B 19/18 82/904 |
| 10,268,176 | B2* | 4/2019 | Sannomiya | B23B 25/02 |
| 10,414,009 | B2* | 9/2019 | Kitakaze | B23Q 15/013 |
| 10,625,355 | B2* | 4/2020 | Watanabe | B23G 3/08 |
| 11,253,924 | B2* | 2/2022 | Kitakaze | G05B 19/19 |
| 11,517,991 | B2* | 12/2022 | Nakaya | B23Q 15/013 |
| 2014/0102268 | A1* | 4/2014 | Hariki | B23Q 5/28 82/117 |
| 2016/0274560 | A1* | 9/2016 | Nakajima | B23B 3/06 |
| 2017/0304920 | A1* | 10/2017 | Sannomiya | G05B 19/4093 |
| 2017/0322538 | A1* | 11/2017 | Watanabe | G05B 19/4093 |
| 2018/0243834 | A1* | 8/2018 | Sannomiya | B23Q 15/013 |
| 2018/0257192 | A1* | 9/2018 | Nakaya | G05B 19/4093 |
| 2020/0094327 | A1* | 3/2020 | Muramatsu | G05B 19/409 |
| 2020/0215710 | A1* | 7/2020 | Shamoto | B26D 7/086 |
| 2021/0370455 | A1* | 12/2021 | Sannomiya | B23Q 15/013 |
| 2022/0161339 | A1* | 5/2022 | Sannomiya | B23B 25/02 |
| 2023/0050486 | A1* | 2/2023 | Sannomiya | G05B 19/4093 |
| 2023/0103408 | A1* | 4/2023 | Fujise | B23B 1/00 82/1.11 |

FOREIGN PATENT DOCUMENTS

| | | | | |
|---|---|---|---|---|
| JP | WO2014045383 | A1 | 8/2016 | |
| JP | 2017177267 | A | 10/2017 | |
| JP | 2020192647 | A * | 12/2020 | ............... B23B 1/00 |
| KR | 1020170063769 | A | 6/2017 | |
| WO | 2014045383 | A1 | 3/2014 | |
| WO | 2016056526 | A1 | 4/2016 | |

OTHER PUBLICATIONS

Mar. 13, 2023, Office Action issued by the Korean Intellectual Property Office in the corresponding Korean Patent Application No. 10-2021-7010423.
Jun. 9, 2023, Office Action issued by the China National Intellectual Property Administration in the corresponding Chinese Patent Application No. 201980066428.7.
May 17, 2022, Office Action issued by the Taiwan Intellectual Property Office in the corresponding Taiwanese Patent Application No. 108138740.
Jul. 8, 2022, the Extended European Search Report issued by the European Patent Office in the corresponding European Patent Application No. 19877229.5.
Jun. 21, 2022, Notification of Reasons for Refusal issued by the Japan Patent Office in the corresponding Japanese Patent Application No. 2018-202337.
Apr. 27, 2021, International Preliminary Report on Patentability issued in the International Patent Application No. PCT/JP2019/041778.

* cited by examiner

MACHINE TOOL AND CONTROL DEVICE

TECHNICAL FIELD

This disclosure relates to a machine tool for cutting a workpiece with a tool, as well as a control device therefor.

BACKGROUND

Conventionally, there is known a machine tool that includes: a workpiece holding means for holding a workpiece; a tool post for holding a tool for cutting the workpiece; a feeding means for relatively moving the workpiece held by the workpiece holding means, and the tool held on the tool post, in a predetermined feed direction; a rotating means for relatively rotating the workpiece held by the workpiece holding means and the tool held by the tool post about an axis of the workpiece; a vibrating means for vibrating the workpiece held by the workpiece holding means and the tool held on the tool post relative to each other in a direction perpendicular to the axis of the workpiece under predetermined vibration conditions; and a control unit for controlling the operation of the feeding means, the rotating means and the vibrating means in order to carry out a vibration cutting of a workpiece by means of a tool, by relatively vibrating the workpiece and the tool in a direction perpendicular to an axial center of the workpiece while relatively moving the workpiece and the tool in a feed direction, with the workpiece and the tool rotated relatively to each other, and to carry out a finish-cutting after the vibration cutting has been completed, for cutting a finishing allowance of the workpiece by means of the tool, without relative vibration between the workpiece and the tool, by rotating the workpiece and the tool and relatively moving them in the feed direction (refer, for example, to PTL 1).

Such a machine tool may be configured to carry out vibration cutting by dividing the cutting path into a plurality of paths having different cutting depths, and designing the plurality of paths such that a path of a predetermined turn passes through a portion cut along a path of a previous turn, in order to generate an idle-swing period in which the workpiece is not cut by the tool during the vibration cutting process, and carry out the cutting process with respect to the workpiece while sequentially breaking cutting chips.

CITATION LIST

Patent Literature

PTL 1: WO 2016/056526 A

SUMMARY

Technical Problem

However, the above-mentioned conventional machine tool suffers from a problem that, even if the workpiece is subjected to vibration cutting to have a predetermined diameter, there remains an uncut portion on the surface of the workpiece after the cutting, with a contour shape corresponding to the trajectory of the vibration of the tool and projecting radially outwards beyond the predetermined diameter, and the uncut portion remaining on the workpiece after completion of the vibration cutting process may become large depending on the vibration conditions such that the tool may be applied with an excessive load upon the finish-cutting of the workpiece.

The present disclosure aims at solving such a problem and it is an object of the present disclosure to provide a machine tool and a control device therefor, capable of preventing an excessive load from being applied to the tool in a finish-cutting process carried out after the vibration cutting process.

Solution to Problem

According to one aspect of the present disclosure, there is provided a machine tool comprising: a workpiece holding means for holding a workpiece; a tool post for holding a tool for cutting the workpiece; a feeding means for relatively moving the workpiece held by the workpiece holding means, and the tool held on the tool post, in a predetermined feed direction; a rotating means for relatively rotating the workpiece held by the workpiece holding means and the tool held by the tool post about an axis of the workpiece; a vibrating means for vibrating the workpiece held by the workpiece holding means and the tool held on the tool post relative to each other in a direction perpendicular to the axis of the workpiece under predetermined vibration conditions; and a control unit for controlling the operation of the feeding means, the rotating means and the vibrating means to carry out a vibration cutting of a workpiece by means of a tool, by relatively vibrating the workpiece and the tool in a direction perpendicular to an axial center of the workpiece while relatively rotating the workpiece and the tool and relatively moving them in a feed direction, and to carry out a finish-cutting after the vibration cutting has been completed, for cutting a finishing allowance of the workpiece by means of the tool, without relative vibration between the workpiece and the tool, by relatively rotating the workpiece and the tool and relatively moving them in the feed direction. The machine tool is characterized in that it further comprises: a finishing allowance calculation means for calculating a finishing allowance remaining on the workpiece after the vibration cutting has been completed; and a determination means for determining whether or not the finishing allowance as calculated by the finishing allowance calculation means is less than, or equal to a prescribed threshold value.

Preferably, the machine tool of the present disclosure with the configuration as described above further comprises a warning means for issuing a warning when it is determined by the determination means that the finishing allowance as calculated by the finishing allowance calculation means exceeds the threshold value.

Preferably, the machine tool of the present disclosure with the configuration as described above further comprises a vibration condition modification means for modifying the vibration cutting condition when it is determined by the determination means that the finishing allowance as calculated by the finishing allowance calculation means exceeds the threshold value.

Preferably, the machine tool of the present disclosure with the configuration as described above further comprises a processing adding means for carrying out an additional cutting when it is determined by the determination means that the finishing allowance as calculated by the finishing allowance calculation means exceeds the threshold value, wherein the additional cutting is carried out with respect to a part of the finishing allowance of the workpiece, without relative vibration between the workpiece and the tool in the direction perpendicular to the axis of the workpiece by relatively rotating the workpiece and the tool and relatively moving them in the feeding direction.

Preferably, in the machine tool of the present disclosure with the configuration as described above, the vibration cutting process is carried out by dividing the vibration cutting path into a plurality of paths having different cutting depths, and the plurality of paths of the vibration cutting process are designed such that a path of a predetermined turn passes through a portion cut along a path of a previous turn.

Preferably, in the machine tool of the present disclosure with the configuration as described above, the vibration cutting process is a thread cutting process on the workpiece.

According to another aspect of the present disclosure, there is provided a control device for use in a machine tool, wherein the machine tool comprises: a workpiece holding means for holding a workpiece; a tool post for holding a tool for cutting the workpiece; a feeding means for relatively moving the workpiece held by the workpiece holding means, and the tool held on the tool post, in a predetermined feed direction; a rotating means for relatively rotating the workpiece held by the workpiece holding means and the tool held by the tool post about an axis of the workpiece; and a vibrating means for vibrating the workpiece held by the workpiece holding means and the tool held on the tool post relative to each other in a direction perpendicular to the axis of the workpiece under predetermined vibration conditions. The control device is characterized in that it comprises: a control unit for controlling the operation of the feeding means, the rotating means and the vibrating means to carry out a vibration cutting of a workpiece by means of a tool, by relatively vibrating the workpiece and the tool in a direction perpendicular to an axial center of the workpiece while relatively rotating the workpiece and the tool and relatively moving them in a feed direction, and to carry out a finish-cutting after the vibration cutting has been completed, for cutting a finishing allowance of the workpiece by means of the tool, without relative vibration between the workpiece and the tool, by relatively rotating the workpiece and the tool and relatively moving them in the feed direction; a finishing allowance calculation means for calculating a finishing allowance remaining on the workpiece after the vibration cutting has been completed; and a determination means for determining whether or not the finishing allowance as calculated by the finishing allowance calculation means is no more less than a prescribed threshold value.

Advantageous Effect

According to the present disclosure, it is possible to provide a machine tool and a control device therefor, capable of preventing an excessive load from being applied to the tool in a finish-cutting process carried out after the vibration cutting process.

DETAILED DESCRIPTION

Preferred embodiments of the present disclosure will be described below with reference to the drawings.

Figure 1:
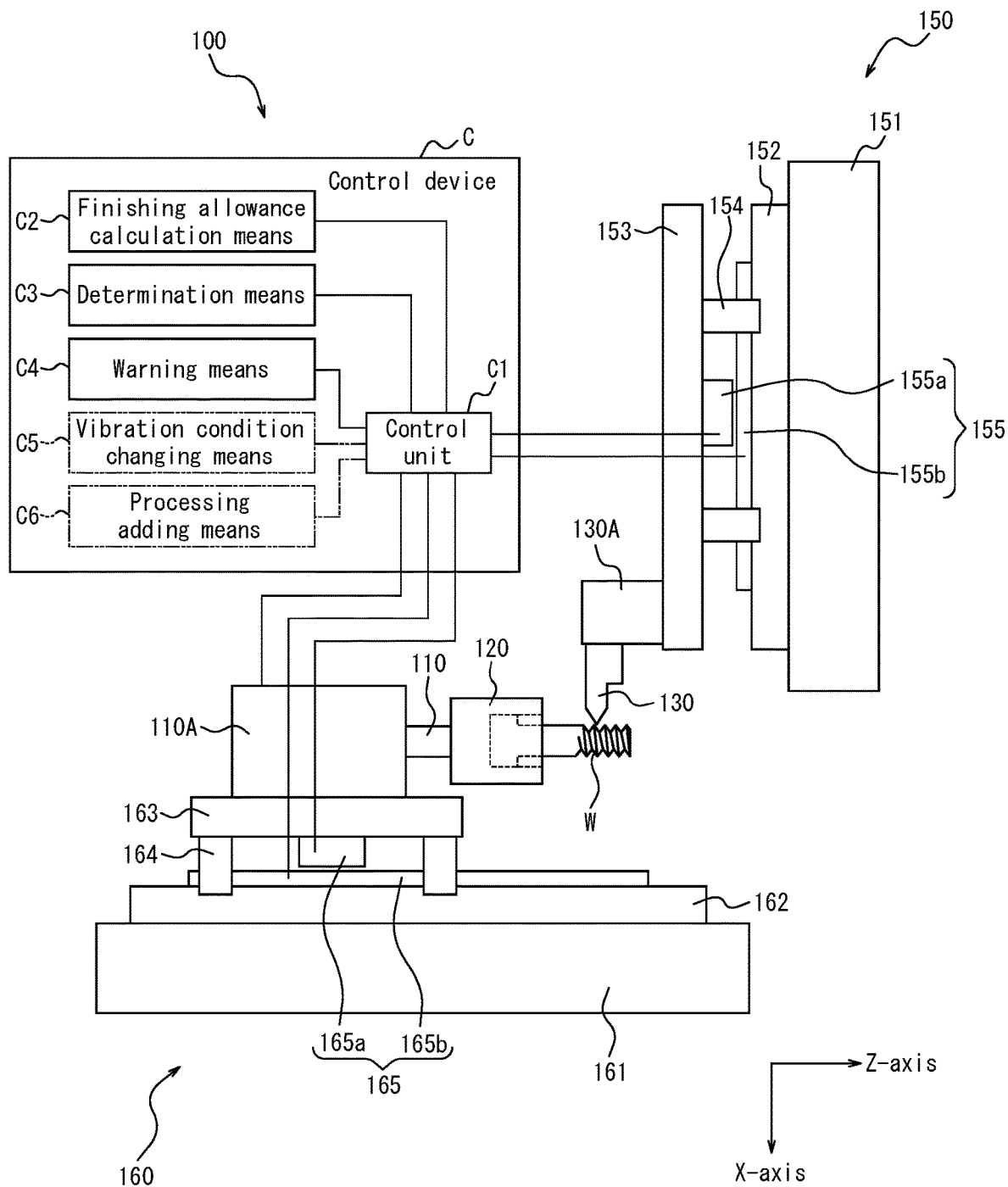
FIG. 1 is an explanatory view schematically illustrating the configuration of the machine tool according to one embodiment of the invention.

FIG. 1 illustrates a machine tool 100 according to one embodiment of the present disclosure, which includes a spindle 110 having an axis arranged to extend in the Z-axis direction. The spindle 110 is provided with a chuck 120 at the tip, and capable of holding a workpiece W by means of the chuck 120. That is, the spindle 110 is configured as a workpiece holding means for holding the workpiece W.

As the workpiece W to be held by the spindle 110, there may be used a member comprised of a metal material, such as a steel material, that is formed in a rod shape having a circular cross-section.

The machine tool 100 includes a cutting tool base 130A. The cutting tool base 130A is configured as a tool post for holding a tool 130, such as a cutting tool for cutting a workpiece W, and the tool 130 is mounted on the cutting tool base 130A.

The spindle 110 is supported by a headstock 110A so as to be rotationally driven by the power of a spindle motor (not shown). As the spindle motor, for example, there may be used a built-in motor arranged between the headstock 110A and the spindle 110 inside the spindle 110A. If the spindle 110 is rotated, the workpiece W held by the spindle 110 and the tool 130 held by the cutting tool base 130A are rotated relative to each other about the axis of the spindle 110. That is, the spindle 110 has a function as a rotating means for relatively rotating the workpiece W and the tool 130 held by the spindle 110 about the axis of the workpiece W or the spindle 110.

The machine tool 100 on its bed side is provided with an X-axis feed mechanism 150. The X-axis feed mechanism 150 includes a base 151 integrated with the bed side and an X-axis guide rail 152 extending in the X-axis direction perpendicular to the Z-axis direction in the vertical direction. The X-axis guide rail 152 is fixed to the base 151. An X-axis feed table 153 is slidably supported on the X-axis guide rail 152 via an X-axis guide 154.

The X-axis direction feed table 153 is provided with a movable element 155a of a linear servomotor 155, and the base 151 is provided with a stationary element 155b of the linear servomotor 155. The X-axis feed table 153 is adapted to be driven by the linear servomotor 155 and moved in the X-axis direction along the X-axis guide rail 152.

The cutting tool base 130A is mounted on the X-axis feed table 153. As the X-axis feed table 153 is moved in the X-axis direction, the cutting tool base 130A is moved in the X-axis direction together with the X-axis feed table 153, and the tool 130 is moved in the X-axis direction.

The X-axis feed table 153 moves the tool 130 in the X-axis direction with respect to the workpiece W so as to have a predetermined cutting amount (cutting depth), and then vibrates the tool 130 held by cutting tool base 130A during the cutting, relative to the workpiece W held by the spindle 110, in the X-axis direction perpendicular to the axis (Z-axis) of the spindle 110, under predetermined vibration conditions. That is, the X-axis feed mechanism 150 functions as a vibrating means for vibrating the workpiece W held on the spindle 110 and the tool 130, relatively in the X-axis direction perpendicular to the axis of the workpiece W under predetermined vibration conditions.

The machine tool 100 on its bed side is provided with a Z-axis feed mechanism 160. The Z-axis feed mechanism 160 includes a base 161 integrated with a fixed side of the Z-axis feed mechanism 160, such as a bed, and a Z-axis guide rail 162 extending in the Z-axis direction and fixed to the base 161. A Z-axis direction feed table 163 is slidably supported on the Z-axis guide rail 162 via a Z-axis guide 164.

The Z-axis feed table 163 is provided with a movable element 165a of a linear servomotor 165, and the base 161 is provided with a stationary element 165b of the linear servomotor 165. The Z-axis feed table 163 is adapted to be driven by the linear servomotor 165 and moved in the Z-axis direction along the Z-axis guide rail 162.

The headstock 110A is mounted on the Z-axis direction feed table 163. As the Z-axis direction feed table 163 is moved in the Z-axis direction, the headstock 110A is moved in the Z-axis direction together with the Z-axis feed table 163, and the spindle 110 is moved in the Z-axis direction.

By operating the X-axis feed mechanism 150 and the Z-axis feed mechanism 160 in cooperation with each other, the workpiece W held by the spindle 110 and the tool 130 held by the cutting tool base 130A can be moved in a predetermined feed direction relative to each other. That is, by the movement of the cutting tool base 130A (tool 130) in the X-axis direction by the X-axis feed mechanism 150 and the movement of the headstock 110A (spindle 110) in the Z-axis direction by the Z-axis feed mechanism 160, the workpiece W held by the spindle 110 and the tool 130 can be relatively moved in any feed direction. As described above, the X-axis feed mechanism 150 and the Z-axis feed mechanism 160 are configured as a feed means.

Figure 2:
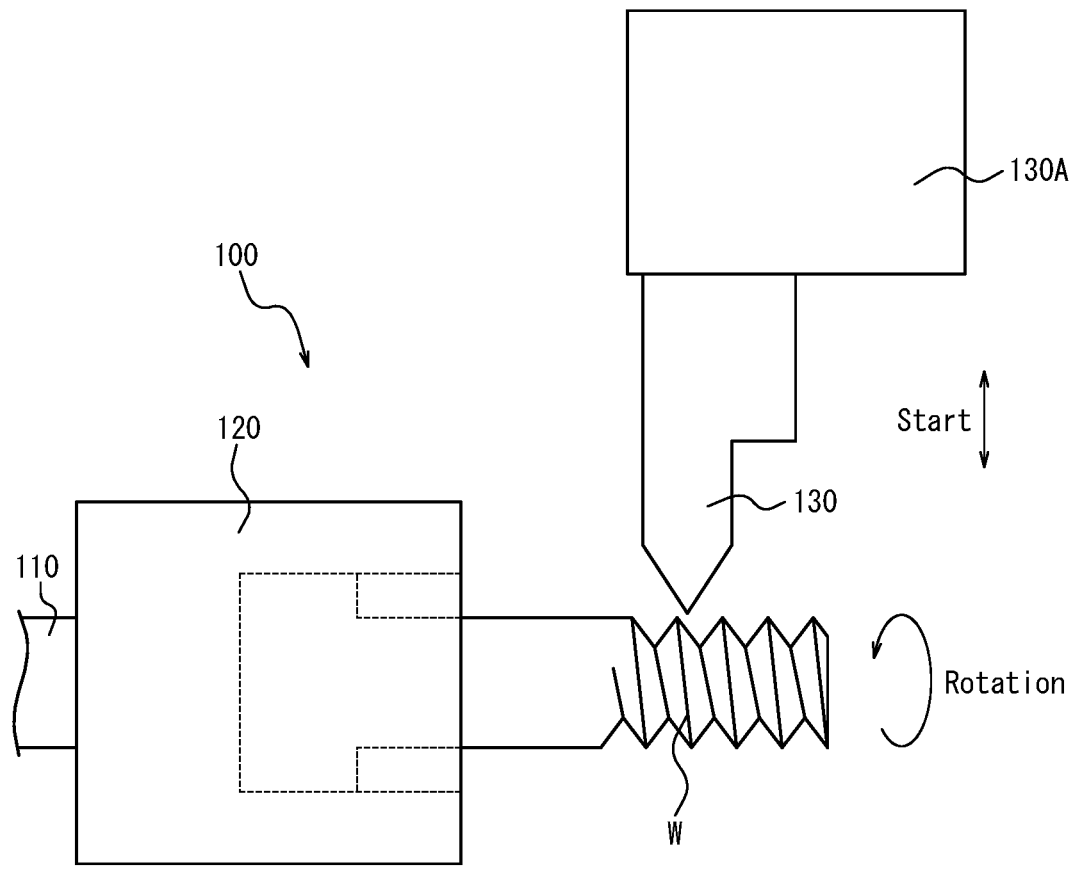
FIG. 2 is a schematic view illustrating the relationship between the tool of the machine tool of FIG. 1 and the workpiece.

As illustrated in FIG. 2, in a state where the spindle 110 is rotationally driven by the spindle motor to rotate the workpiece W and the tool 130 relative to each other, if the workpiece W and the tool 130 are relatively vibrated in a direction perpendicular to the axis of the workpiece W (cutting direction) while being relatively moved in any feed direction, it is possible to carry out a vibration cutting of the workpiece W by means of the tool 130. Furthermore, after the vibration cutting process has been completed, if the workpiece W and the tool 130 are relatively moved in any feed direction while being relatively rotated, without relative vibration in a direction perpendicular to the axis of the workpiece W, it is possible to carry out a finish-cutting process wherein the finishing allowance of the workpiece W is subjected to cutting by means of the tool 130.

The machine tool 1 includes a control device C. As the control device C, for example, there may be used a microcomputer having a calculation unit such as a CPU (central processing unit) and a storage unit such as a memory. For example, a cutting program for the vibration cutting or the finish-cutting may be input to the control device C and stored in the storage unit. The cutting program includes the vibration conditions for the vibration of the tool 130 with respect to the workpiece W in the vibration cutting process.

The spindle 110 (spindle motor), the X-axis feed mechanism 150, and the Z-axis feed mechanism 160 are connected to the control device C.

The control device C has a function as a control unit C1. The control unit C1 controls the operation of the spindle 110, the X-axis feed mechanism 150 and the Z-axis feed mechanism 160 based on the cutting program as stored in the storage unit so as to carry out the vibration cutting process and the finish-cutting process. That is, the control unit C1 serves to control the operation of the spindle 110, the X-axis feed mechanism 150 and the Z-axis feed mechanism 160 so as to carry out the vibration cutting of the workpiece W by means of the tool 130 while the workpiece W and the tool 130 are moved relative to each other in the feed direction rotated relative to each other. The vibration of the tool 130 in the above-mentioned vibration cutting process is executed based on the vibration conditions in the cutting program stored in the storage unit. After the above-mentioned vibration cutting, the control unit C1 further serves to control the operation of the spindle 110, the X-axis feed mechanism 150 and the Z-axis feed mechanism 160 so as to carry out the finish-cutting process by means of the tool 130, by moving the workpiece W and the tool 130 relative to each other in the feed direction while they are rotated relatively to each other without relative vibration in the direction perpendicular to the axis of the workpiece W.

Figure 3:
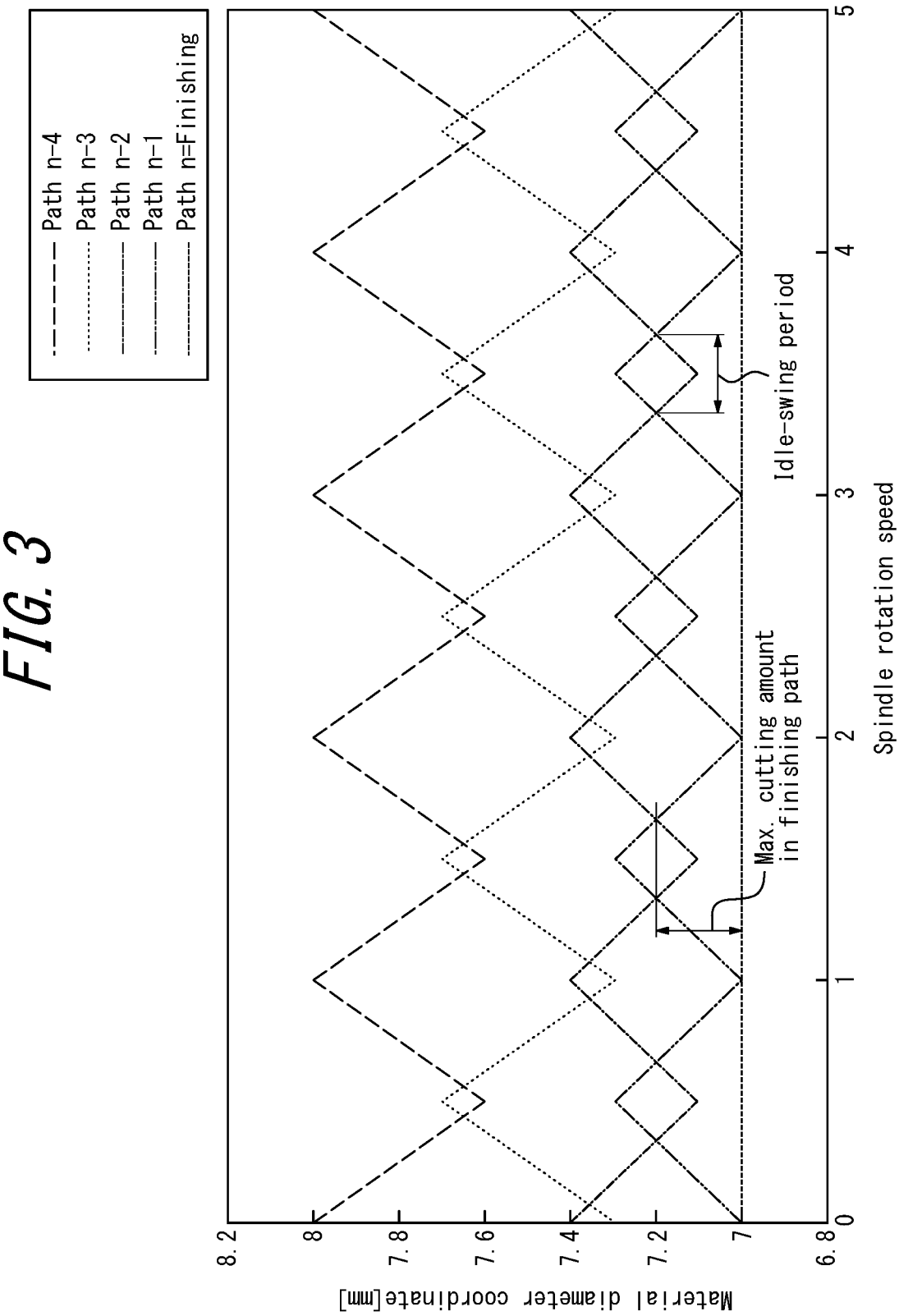
FIG. 3 is an explanatory view illustrating the cutting paths of the tool with respect to the workpiece.

As illustrated in FIG. 3, in the present embodiment, the machine tool 1 is configured such that the above-mentioned vibration cutting process is carried out along a plurality of divided paths having different cutting amounts. That is, at the same feed position in the axial direction of the workpiece W, the machine tool 1 repeatedly carries out the vibration cutting process by means of the tool 130 to have a predetermined cutting depth while gradually increasing the cutting depth of the tool 130 with respect to the workpiece W for the respective paths.

Further, in the above configuration, the plurality of paths for the vibration cutting are set so that a path of a predetermined turn passes through a part that has already been cut by the previous path. That is, the path of the tool 130 at the predetermined turn in the vibration cutting process is shifted in phase by a predetermined angle (180 degrees in the figure) with respect to the previous path, such that the path of the predetermined turn is set to pass through the part of the workpiece W that has already been cut by the previous path. By setting the cut portion on the outer peripheral surface of the workpiece W by the predetermined path to include the cut portion of the previous path, the machine tool 1 during the vibration cutting process causes an idle-swing period in which the workpiece W is not subjected to cutting at that part, thereby carrying out the cutting process of the workpiece W while sequentially breaking chips. This makes it possible to facilitate the processing of chips during the vibration cutting process.

In FIG. 3, among the plurality of paths in the vibration cutting process, the last four paths are illustrated as path n-4, path n-3, path n-2 and path n-1, and the path of the finish-cutting process is illustrated as path n. In each path, n is a natural number. The number of the vibration cutting path is not limited to four times and may be set as desired.

As illustrated in FIG. 2, in the present embodiment, the vibration cutting process described above is a thread cutting process for cutting a helical thread groove on the outer peripheral surface of the workpiece W. By carrying out the thread cutting on the workpiece W by means of the above-mentioned vibration cutting process, it is possible to prevent chips from getting entangled in the thread groove after the processing and to carry out the thread cutting process efficiently and accurately.

The control device C is provided with a function as a finishing allowance calculation means C2. The finishing allowance calculation means C2 is operated before the vibration cutting process, in particular after a cutting program has been input to the control device C and before the vibration cutting process is carried out based on the cutting program, so as to calculate, based on the cutting program stored in the storage unit, the finishing allowance expected to remain in the workpiece W after the vibration cutting process, when the vibration cutting of the workpiece W by means of the tool 130 has been carried out based n the cutting program.

The finishing allowance is a portion that has been cut and removed from the workpiece W in the finish-cutting process after the vibration cutting process.

The manner of calculation of the finishing allowance by means of the finishing allowance calculating means C2 will be described below more specifically.

When the cutting depth of the tool 130 is set so that the workpiece W has a predetermined outer diameter and cutting is performed in the final path of the vibration cutting process, then the outer peripheral surface of the workpiece W has a shape corresponding to the trajectory of the tool 130 due to the vibration of the tool 130, and there is formed an uncut portion that protrudes radially outward from the predetermined diameter. In particular, when a plurality of paths for the vibration cutting are set so that a path of a predetermined turn passes through a portion that has been cut by the previous path, the outer peripheral surface of the workpiece W is formed with an uncut portion that protrudes radially outward from the predetermined diameter with a shape that corresponds to the trajectory of the tool 130 in the last path and the second last path. When the vibration cutting process is performed based on the cutting program stored in the storage unit, the finishing allowance calculation means C2 calculates the remaining uncut amount (the radial height of the remaining uncut portion) expected as described above to remain on the outer peripheral surface of the workpiece W, based on the cutting program (and depending on the shape, outer diameter, etc. of the workpiece W). Then, by adding to the calculated uncut amount with the cutting amount of the tool 130 with respect to the workpiece W in the finish-cutting process, the finishing allowance calculating means C2 calculates the finishing allowance in the finish-cutting process, that is, the maximum cutting amount to be cut and removed from the workpiece W by means of the tool 130 in the path of the finish-cutting process. When the finish cutting process is instructed to be a zero cutting, the calculated uncut amount is the finishing allowance or the maximum cutting amount.

In the present embodiment, as illustrated in FIG. 3, the plurality of paths of the vibration cutting process is set so that the amplitude of the vibration of the tool 130 in the direction perpendicular to the axis of the workpiece W in the path of the predetermined turn is smaller than that in the previous path. With this setting, it is possible to reduce the amount of uncut portion remaining on the workpiece W when the vibration cutting process has been completed. It should be noted that the vibration amplitude may be set to be the same throughout all the paths of the vibration cutting process.

The control device C is provided with a function as a determination means C3. The determination means C3 serves to determine whether or not the finishing allowance (maximum cutting amount) calculated by the finishing allowance calculating means C2 is no more than a predetermined threshold value.

The predetermined threshold value used for the determination by means of the determination means C3 is a value appropriately set according to the material, shape, outer diameter of the workpiece W, the material and shape of the tool 130, the rotation speed of the spindle 110, and other cutting conditions, which is determined in advance by experiment or the like, input to the control device C and stored in the storage unit. The threshold value may be set as multiple of the assumed cutting amount to be cut in the finish-cutting process or may be set as an absolute value.

If the determination means C3 determines that the finishing allowance (maximum cutting amount) calculated by the finishing allowance calculating means C2 is no more than a predetermined threshold value, then the control device C determines that there is no abnormality in the cutting program stored in the storage unit and allows the cutting to be carried out when a cutting command is input by an operator.

On the other hand, the control device C is provided with a function as a warning means C4, and if it is determined that the finishing allowance (maximum cutting amount) calculated by the finishing allowance calculating means C2 by the determining means C3 exceeds a predetermined threshold value, then the warning means C4 issues a warning indicating that there is an error (abnormality) in the cutting program stored in the storage unit. In the present embodiment, the warning means C4 is configured to issue a warning by displaying the existence of an error, for example, on the monitor provided in the control device C.

However, provided that the warning means C4 makes it possible for the operator of the machine tool 1 to recognize an error in the cutting program since the finishing allowance calculated by the finishing allowance calculating means C2 exceeded the predetermined threshold value, the warning may be issued by another method or configuration, such as emitting a warning light from a warning light source connected to the control device C, or emitting a warning sound from a warning sound source connected to the control device C.

Next, with reference to FIG. 4, explanation will be made of the procedure for checking errors in the cutting program that has been input to the control device C, before subjecting the workpiece W to a thread cutting with a predetermined shape, for that cutting.

When the cutting program is input to the control device C, before the vibration cutting, the finishing allowance calculation means C2 in step S1 calculates, based on the cutting program stored in the storage unit, the amount of uncut portion remaining in the workpiece W after completion of the vibration cutting process by means of the tool 130 based on the cutting program.

Then, in step S2, the finishing allowance calculating means C2 adds the cutting amount (described in the cutting program) of the tool 130 with respect to the workpiece W in the finish-cutting process to the uncut amount calculated in step S1 so as to calculate the finishing allowance in the finish-cutting process, that is, the maximum cutting amount from the workpiece W in the finish-cutting process path.

When the threshold value preset and stored in the storage unit is called in step 3, the determination means C3 determines in step 4 whether the cutting amount (finishing allowance) calculated in step S2 is equal to or less than the predetermined threshold value called in step S3.

In step S4, if the determination means C3 determines that the cutting amount is equal to or less than the threshold value, then, in step S5, the control device C determines that there is no abnormality in the cutting program and the error check of the cutting program is terminated.

If it is determined in the above check that there is no abnormality in the cutting program, then the machine tool 1 is set in a state where the cutting of the workpiece W can be carried out. Thus, when a cutting command is input to the control device C by an operator, the control unit C1 controls the operation of the spindle 110, the X-axis feed mechanism 150 and the Z-axis feed mechanism 160 to sequentially carry out the vibration cutting and the finish-cutting with respect to the workpiece W.

On the other hand, if it is determined in step S4 that the cutting amount exceeds the threshold value, then in step S6, the warning means C4 displays on the monitor of the control device C that there is an error (abnormality) in the cutting program. If an error is displayed on the monitor, it is possible for the operator to recognize that, when the cutting of the workpiece W is carried out based on the cutting program, then the finishing allowance (maximum cutting amount) cut by the tool 130 in the finish-cutting process would become large and an excessive load might be applied to the 130. Having recognized such error, the operator can correct the vibration conditions or the like in the cutting program as stored in the control device C.

The control device C may be configured such that, when a warning is issued by the warning means C4, the monitor of the control device C displays a vibration waveform or contour diagram (vibration contour diagram) of the tool 130 in the vibration cutting process. By this, the operator can be prompted to intuitively recognize the uncut amount or the maximum cut amount and easily attend to a manual correction of the cutting program.

In the machine tool 1, due to the limitation in mechanical followability of the X-axis feed mechanism 150 or the requirement for positively breaking the chips, there may be a situation where the amplitude of the tool 130 during the vibration cutting cannot be reduced such that the maximum amplitude of the tool 130 in the vibration cutting process to be cut by the tool 130 in the finish-cutting process is not more than the threshold value. In this case, if the cutting of the workpiece W is carried out based on the cutting program, an excessive load may be applied to the tool 130 in the finish-cutting.

In contrast, according to the machine tool 1 of the present embodiment, any error in the cutting program can be checked before an actual cutting of the workpiece W, so that the operator can recognize, before the actual cutting of the workpiece W, that the tool 130 may be applied with an excessive load during the finish-cutting. By this, since the cutting program can be corrected before the cutting of the workpiece W, it is possible to prevent the workpiece W from being processed based on the cutting program having an error and also to prevent the tool 130 from being applied with an excessive load during the finish-cutting after the vibration cutting. Furthermore, by preventing an excessive load from being applied to the tool 130, it is possible to prevent the tool 130 from damages or the like.

In particular, when thread cutting is to be carried out on the workpiece W by the machine tool 1, if the amount of uncut portion generated in the workpiece W after completion of the vibration cutting is large, the load applied to the tool 130 during the finish-cutting of the workpiece W becomes markedly large, and this may cause damage to the tool 130 and shorten the life of the tool and may lower the accuracy of the finished surface. However, according to the machine tool 1 of the present embodiment, even if the workpiece W is subjected to thread cutting, it is possible to prevent the workpiece W from being processed based on the cutting program having an error, and to prevent an excessive load from being applied to the tool 130 in the finish-cutting process after the vibration cutting process. By this, when the workpiece W is threaded by the machine tool 1, the life of the tool 130 can be improved and the finishing accuracy of the threaded portion can be improved.

Furthermore, according to the machine tool 1 of the present embodiment, in contrast to the method wherein an image of the locus of the tool is calculated based on the cutting program and the locus of the tool on that image is compared with the shape of the target workpiece on the image for determining whether the workpiece would be applied to the tool during the cutting, it is possible to more easily and accurately determine that an excessive load may be applied to the tool 130 during the finish-cutting process.

Figure 4:
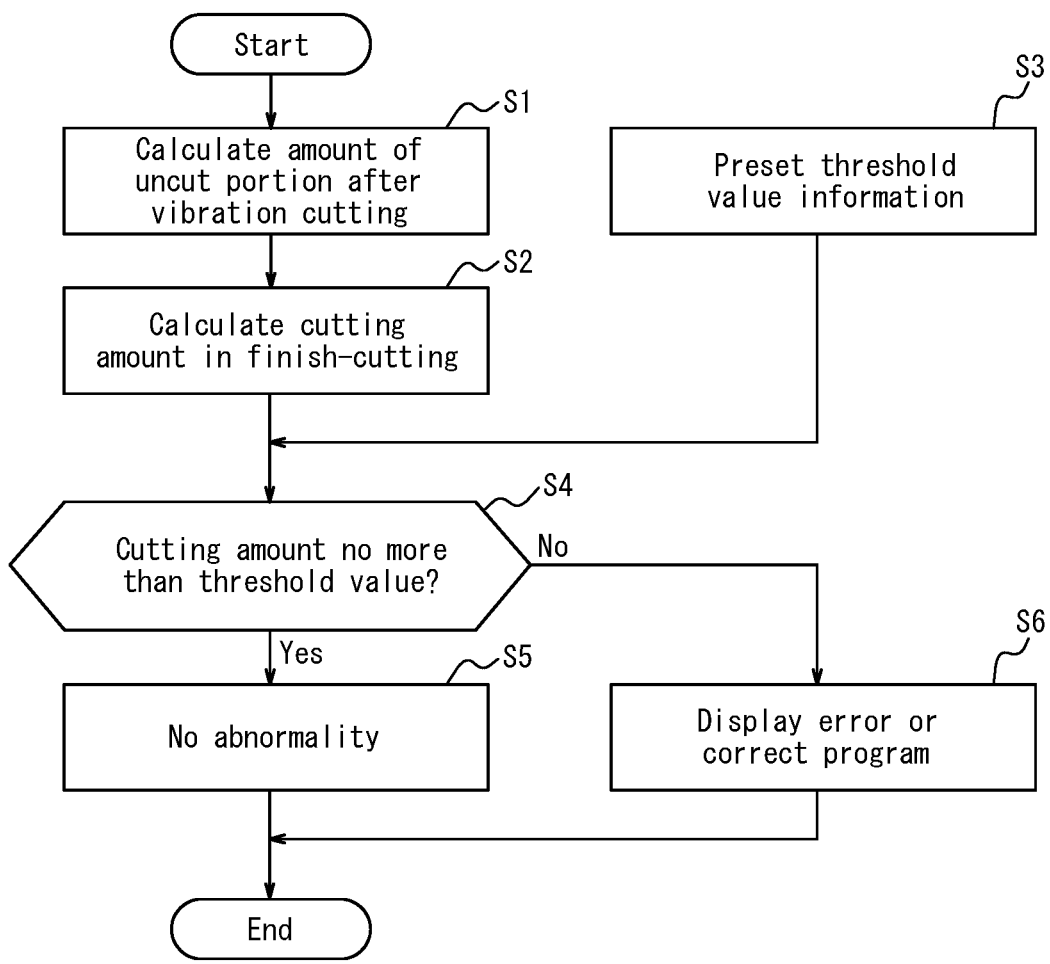
FIG. 4 is a flowchart illustrating the checking procedure of the cutting program.

In the present embodiment, the control device C is configured such that, when it is determined in step S4 of FIG. 4 that the cutting amount exceeds the threshold value, then in step S6, the warning means C4 displays the presence of an error (abnormality) in the cutting program, on the monitor of the control device C, and prompt the operator to recognize the error and correct the cutting program. However, the configuration may be such that, when it is determined in step S4 that the cutting amount exceeds the threshold value, then in step S6, the cutting program is automatically corrected by the control device C.

In this case, for example, as indicated by the two-dot chain line in FIG. 1, the control device C may be provided with a function as the vibration condition changing means C5. If it is determined in step S4 that the cutting amount exceeds the threshold value, then the vibration condition changing means C5 automatically changes the vibration condition of the vibration cutting process included in the cutting program such that the cutting amount (finishing allowance) is not more than the threshold value. For example, the vibration condition changing means C5 corrects the vibration condition of the vibration cutting process such that the amplitude of the last path of the vibration cutting process is smaller than that before the correction. By this, the amount of uncut portion remaining on the outer peripheral surface of the workpiece W (the radial height of the uncut portion) after the vibration cutting process is made smaller than that before the correction so that the maximum cutting amount of the tool 130 in the finish-cutting process is no more than the threshold value.

The vibration condition changing means C5 is not limited to the configuration wherein, if it is determined in step S4 that the cutting amount exceeds the threshold value, then the vibration condition of the vibration cutting process is corrected such that the amplitude of the last path of the vibration cutting is made smaller than that before the correction. Thus, the manner of correction may be changed in various manner provided that the uncut amount remaining on the outer peripheral surface of the workpiece W after the vibration cutting can be made smaller than that before the correction, such as correcting the amplitude of the previous path, in addition to the last path, of the vibration cutting process, to be smaller than before the correction, etc.

Figure 5:
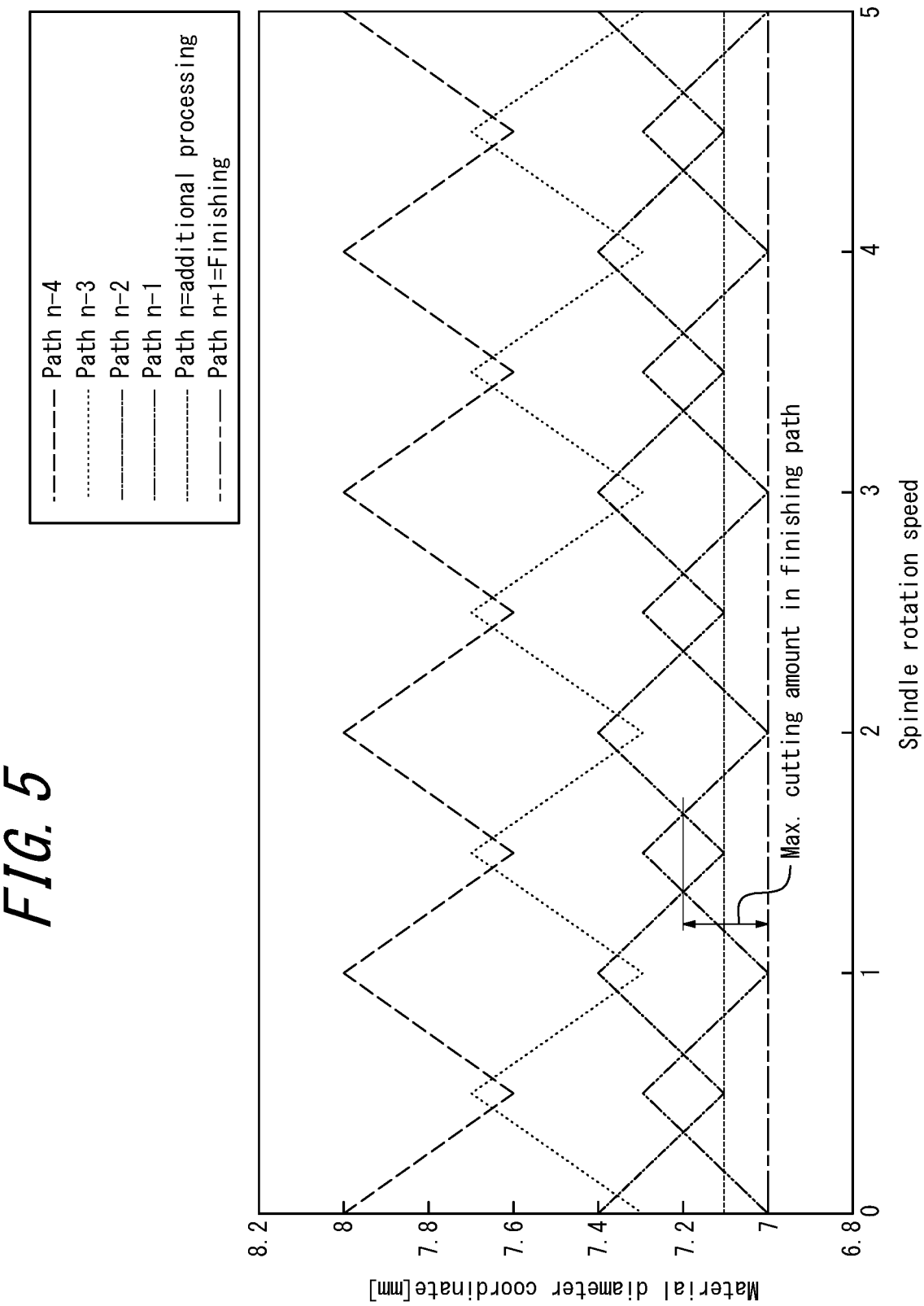
FIG. 5 is an explanatory view illustrating the cutting paths of the tool with respect to the workpiece when the finish-cutting process is divided into a plurality of paths.

Furthermore, for example, as indicated by the two-dot chain line in FIG. 1, the control device C may be provided with a function as a processing adding means C6 instead of the vibration condition changing means C5. If it is determined in step S4 that the cutting amount exceeds the threshold value, as illustrated in FIG. 5, the processing adding means C6 adds a cutting process for cutting a part of the finishing allowance of the workpiece W (illustrated in FIG. 5 as path n) after the vibration cutting and before the finish-cutting, by relatively rotating the workpiece W and the tool 130 and relatively moving them in the feed direction, without relative vibration in the direction perpendicular to the axis of the workpiece W. The additional processing is set so that the cutting amount upon cutting of a part of the finishing allowance is no more than the above-mentioned threshold value. If it is not possible to reduce the finishing allowance to be no more than the above-mentioned threshold value by a single additional processing, the configuration may be such that multiple processing are added for making the cutting amount to be not more than the above-mentioned threshold value, in order to sequentially cut and remove the finishing allowance by these additional processing. With such a configuration, before the finish-cutting process, the amount of uncut portion remaining on the outer peripheral surface of the workpiece W (the radial height of the uncut portion) can be processed to be smaller than that before the correction. By this, it is possible to prevent an excessive load from being applied to the tool 130 in the finish-cutting process by setting the maximum cutting amount of the tool 130 in the finish-cutting process (illustrated in FIG. 5 as path n+1) to be no more than the threshold value.

In the configuration provided with the vibration condition changing means C5 described above, due to the limitation in mechanical followability of the X-axis feed mechanism 150 or the requirement for positively breaking the chips, there may be a situation where the amplitude of the tool 130 during the vibration cutting cannot be reduced such that the maximum amplitude of the tool 130 in the vibration cutting process to be cut by the tool 130 in the finish-cutting process is not more than the threshold value. However, even in such a case, according to the configuration provided with the processing adding means C6, the maximum cutting amount upon finish-cutting by means the tool 130 can be set to be equal to, or less than the threshold value. Furthermore, since the additional processing path passes through the processed portion in the vibration cutting processing, the cutting processing can be carried out while breaking the chips.

Needless to mention, the present disclosure is not limited to the above-described embodiment and can be variously modified without departing from the scope of the invention.

In the present embodiment, both the headstock 110A and the cutting tool base 130A are movable. However, either one of the headstock 110A or the cutting tool base 130A may be immovably fixed to the bed side of the machine tool 100, with the other being movable both in the X-axis direction and the Z-axis direction.

In the present embodiment, the X-axis feed mechanism 150 and the Z-axis feed mechanism 160 are driven by the linear servomotors 155 and 165, respectively. However, they may be configured to be driven by a driving device including a ball/screw mechanism and a servomotor.

In the present embodiment, the workpiece W is rotated with respect to the tool 130. However, the tool 130 may be rotated with respect to the workpiece W. In this case, a rotary tool, such as a drill, may be considered as the tool 130.

In the present embodiment, in addition to the X-axis feed mechanism 150 and the Z-axis feed mechanism 160, the machine tool 1 may further include a Y-axis direction feed mechanism for moving the workpiece W and the tool 130 held by the spindle 110 in a direction perpendicular to the Z-axis and the X-axis. The Y-axis feed mechanism may have the same structure as the X-axis feed mechanism 150.

In the present embodiment, the machine tool 1 is used to carry out thread cutting on the workpiece W. However, the present disclosure is not limited to this, and may be configured to carry out cutting on the workpiece W, other than thread cutting.

REFERENCE SIGNS LIST

100 Machine tool
110 Spindle
110A Headstock
120 Chuck
130 Tool
130A Cutting tool base
150 X-axis feed mechanism
151 Base
152 X-axis guide rail
153 X-axis feed table
154 X-axis guide
155 Linear servomotor
155*a* Movable element
155*b* Stationary element
160 Z-axis feed mechanism
161 Base
162 Z-axis guide rail
163 Z-axis feed table
164 Z-axis direction guide
165 Linear servomotor
165*a* Movable element
165*b* Fixed element
C Control device
C1 Control unit
C2 Finishing allowance calculation means
C3 Determination means
C4 Warning means
C5 Vibration condition changing means
C6 Processing adding means

The invention claimed is:

1. A machine tool comprising:
a workpiece holding means for holding a workpiece;
a tool post for holding a tool for cutting the workpiece;
a feeding means for relatively moving the workpiece held by the workpiece holding means, and the tool held on the tool post, in a predetermined feed direction;
a rotating means for relatively rotating the workpiece held by the workpiece holding means and the tool held by the tool post about an axis of the workpiece;
a vibrating means for vibrating the workpiece held by the workpiece holding means and the tool held on the tool post relative to each other in a direction perpendicular to the axis of the workpiece under predetermined vibration conditions; and
a control unit for controlling the operation of the feeding means, the rotating means and the vibrating means to carry out a vibration cutting of a workpiece by means of a tool, by relatively vibrating the workpiece and the tool in a direction perpendicular to an axial center of the workpiece while relatively rotating moving the workpiece and relatively moving them in a feed direction, and to carry out a finish-cutting after the vibration cutting has been completed, for cutting a finishing allowance of the workpiece by means of the tool, without relative vibration between the workpiece and the tool, by relatively rotating the workpiece and the tool and relatively moving them in the feed direction; characterized in that the cutting tool further comprises:
a finishing allowance calculation means for calculating a finishing allowance remaining on the workpiece after the vibration cutting has been completed, wherein the finishing allowance is a maximum cutting amount to be cut and removed from the workpiece in the finish-cutting carried out after the vibration cutting has been completed, and is calculated as a sum of a radial height of a remaining uncut portion of the workpiece and a cutting amount to be cut by the tool in the finish-cutting; and
a determination means for determining whether or not the finishing allowance as calculated by the finishing allowance calculation means is less than, or equal to a prescribed threshold value.

2. The machine tool according to claim 1, further comprising a warning means for issuing a warning when it is determined by the determination means that the finishing allowance as calculated by the finishing allowance calculation means exceeds the threshold value.

3. The machine tool according to claim 1, further comprising a vibration condition modification means for modifying the vibration cutting condition when it is determined by the determination means that the finishing allowance as calculated by the finishing allowance calculation means exceeds the threshold value.

4. The machine tool according to claim 1, further comprising a processing adding means for carrying out an additional cutting when it is determined by the determination means that the finishing allowance as calculated by the finishing allowance calculation means exceeds the threshold value, wherein the additional cutting is carried out with respect to a part of the finishing allowance of the workpiece, without relatively vibration between the them in the direction perpendicular to the axis of the workpiece, by relatively rotating the workpiece and the tool and relatively moving them in the feeding direction.

5. The machine tool according to claim 1, wherein the vibration cutting process is carried out by dividing the vibration cutting path into a plurality of paths having different cutting depths, and the plurality of paths of the vibration cutting process are designed such that a path of a predetermined turn passes through a cut portion along a path of a previous turn.

6. The machine tool according to claim 1, wherein the vibration cutting process is a thread cutting process on the workpiece.

7. A control device for use in a machine tool, wherein the machine tool comprises:
   a workpiece holding means for holding a workpiece;
   a tool post for holding a tool for cutting the workpiece;
   a feeding means for relatively moving the workpiece held by the workpiece holding means, and the tool held on the tool post, in a predetermined feed direction;
   a rotating means for relatively rotating the workpiece held by the workpiece holding means and the tool held by the tool post about an axis of the workpiece; and
   a vibrating means for vibrating the workpiece held by the workpiece holding means and the tool held on the tool post relative to each other in a direction perpendicular to the axis of the workpiece under predetermined vibration conditions, characterized in that the control device comprises:
   a control unit for controlling the operation of the feeding means, the rotating means and the vibrating means to carry out a vibration cutting of a workpiece by means of a tool, by relatively vibrating the workpiece and the tool in a direction perpendicular to an axial center of the workpiece while relatively rotating the workpiece and the tool and relatively moving them in a feed direction, and to carry out a finish-cutting after the vibration cutting has been completed, for cutting a finishing allowance of the workpiece by means of the tool, without relative vibration between the workpiece and the tool, by relatively rotating the workpiece and the tool and relatively moving them in the feed direction;
   a finishing allowance calculation means for calculating a finishing allowance remaining on the workpiece after the vibration cutting has been completed, wherein the finishing allowance is a maximum cutting amount to be cut and removed from the workpiece in the finish-cutting carried out after the vibration cutting has been completed, and is calculated as a sum of a radial height of a remaining uncut portion of the workpiece and a cutting amount to be cut by the tool in the finish-cutting; and
   a determination means for determining whether or not the finishing allowance as calculated by the finishing allowance calculation means is no more than a prescribed threshold value.

8. The machine tool according to claim 2, wherein the vibration cutting process is carried out by dividing the vibration cutting path into a plurality of paths having different cutting depths, and the plurality of paths of the vibration cutting process are designed such that a path of a predetermined turn passes through a cut portion along a path of a previous turn.

9. The machine tool according to claim 3, wherein the vibration cutting process is carried out by dividing the vibration cutting path into a plurality of paths having different cutting depths, and the plurality of paths of the vibration cutting process are designed such that a path of a predetermined turn passes through a cut portion along a path of a previous turn.

10. The machine tool according to claim 4, wherein the vibration cutting process is carried out by dividing the vibration cutting path into a plurality of paths having different cutting depths, and the plurality of paths of the vibration cutting process are designed such that a path of a predetermined turn passes through a cut portion along a path of a previous turn.

11. The machine tool according to claim 2, wherein the vibration cutting process is a thread cutting process on the workpiece.

12. The machine tool according to claim 3, wherein the vibration cutting process is a thread cutting process on the workpiece.

13. The machine tool according to claim 4, wherein the vibration cutting process is a thread cutting process on the workpiece.

14. The machine tool according to claim 5, wherein the vibration cutting process is a thread cutting process on the workpiece.

* * * * *